Sept. 17, 1963  T. P. HURLEY ETAL  3,103,734
FULLY SILVERED CERAMIC
Filed Aug. 8, 1958
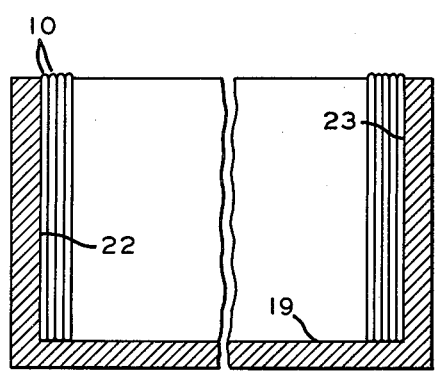
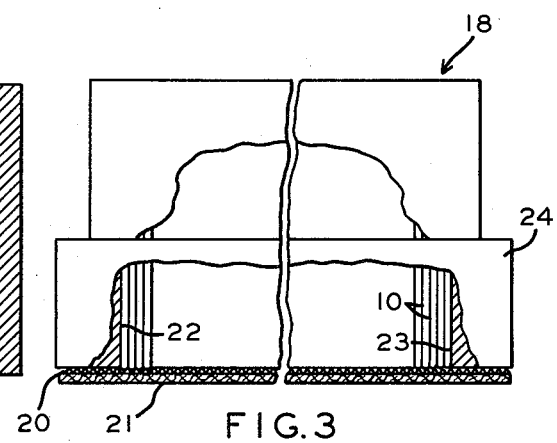
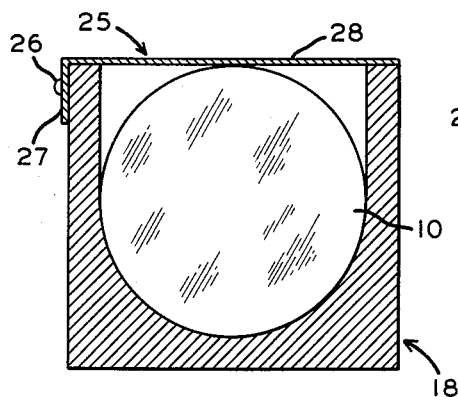
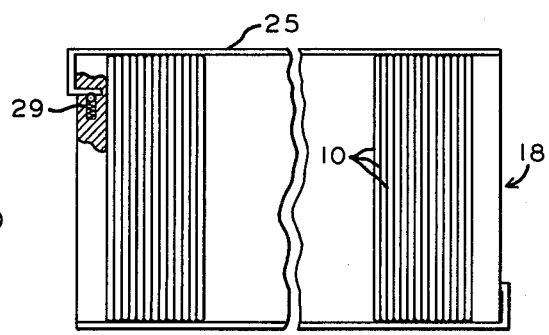
THOMAS P. HURLEY
FRANK L. DONOHUE
JAMES R. TEEPLE
*INVENTORS*
BY *Connolly and Hutz*
*ATTORNEYS*

United States Patent Office 3,103,734
Patented Sept. 17, 1963

3,103,734
FULLY SILVERED CERAMIC
Thomas P. Hurley, Pownal, Vt., and Frank L. Donohue and James R. Teeple, Nashua, N.H., assignors to Sprague Electric Company, North Adams, Mass., a corporation of Massachusetts
Filed Aug. 8, 1958, Ser. No. 753,969
4 Claims. (Cl. 29—25.42)

This invention relates to ceramic disc capacitors and more particularly to fully silvered ceramic disc capacitors.

A ceramic capacitor has electrodes applied to the two large lateral surfaces of a thin ceramic disc. Electrodes such as silver electrodes applied to these surfaces approach the periphery of the disc. It has long been desired to fully silver the broad surfaces of ceramic discs so as to obtain maximum capacity per unt volume of capacitor structure. However, the fabrication of a capacitor having silver electrodes which terminate at the periphery of the ceramic disc has presented problems. One of the problems which results from carrying the electrode to the actual disc periphery is an encroachment of a silver electrode beyond the disc periphery and across the separating dielectric so as to reach and come in contact with the opposing electrode. This bridging between electrodes can result from slopping over of the fluid electrode material during its application to the ceramic surface. Attempts have been made to eliminate this slopping over by various complicated techniques of electrode application. There are many shortcomings, however, in these techniques. Generally present ceramic discs have a margin at the edge of the electrode surface which is free of the silver electrode. This margin is a safety factor to insure against the bridging between the electrodes. In ceramic capacitors of the relatively small sizes, the active electrode area is made as large a proportion of the lateral electrode surface areas as possible. In these capacitors the inclusion of a safety margin is objectionable. It is desired in miniature capacitors to have the ceramic disc as small as possible and the active electrode area as large as possible in relation to the surface area.

It is an object of this invention to provide a miniature silvered ceramic capacitor having a maximum area of active electrode.

It is another object of this invention to provide a means and method for silvering a ceramic disc with active electrodes which extend to the edge of the ceramic disc.

It is still another object of this invention to provide a ceramic disc capacitor with silver electrodes extending to the periphery of a ceramic dic.

These and other objects of this invention will become more apparent when taken together with the accompanying drawings in which:

FIG. 1 is a radial section of a silvered ceramic disc capacitor according to this invention;

FIG. 2 is a vertical section of silvered ceramic disc capacitors as loaded in a nest;

FIG. 3 is a front elevation of the nest according to this invention holding silvered ceramic discs mounted in inverted position in a frame over a belt sander with the frame and nest partly broken away to show the discs;

FIG. 4 is a side sectional view of the nest and discs as loaded in the nest and covered according to this invention; and FIG. 5 is a vertical section of silvered ceramic discs loaded in a modified nest according to this invention.

In general, this invention provides a means and method for producing a ceramic capacitor in which silver electrodes cover broad lateral surfaces of a ceramic disc to the periphery of the disc but do not bridge over the lateral sides and are separated by the dielectric ceramic. The means is comprised of an open topped nest which receives the discs and a belt sander which abrades the disc edges. The discs contained in the nest are brought into contact with the abrasive surface of the belt sander. The result is a ceramic capacitor having electrodes covering the capacitor surfaces to the outer periphery of the disc but not extending over the edge.

In FIG. 1 a silvered ceramic disc 10 is shown in radial section having a thin body 11 and two large lateral surfaces 12 and 13 separated by a very narrow periphery 16. On the surface 12 there is formed a silver electrode 14 and on the lateral surface 13 of the disc 10 there is formed an electrode 15. The electrodes 14 and 15 are separated by the dielectric ceramic body 11. At the left edge of the disc 10 there is shown a silver bridge 17 extending over the periphery 16 to connect the electrodes 14 and 15.

The capacitor discs 10 are silvered by any suitable technique which completely covers the lateral walls with a silver electrode material. This deposition of electrode material on the lateral surfaces 12 and 13 may be accomplished by any suitable means such as spray, dip or even screening the electrode material onto the disc. The deposition of the silver electrode material on the silver disc is effected so as to completely cover the lateral surface with no concern to the spilling over or interconnection of the electrode areas. When the silver electrodes 14 and 15 are solidified on their respective surfaces 12 and 13 the individual capacitors are processed to provide dielectric separation of the electrodes.

It is the purpose of this invention to provide a means and method for removing bridges such as bridge 17 from silvered ceramic disc such as disc 10. An open-topped nest 18 has an interior wall 19 shaped to conform to the circular outline of the ceramic capacitor discs 10. The silvered ceramic discs 10 are inserted edgewise into the open top of the nest 18. The chamber formed in the nest 18 by the interior wall 19 holds the capacitor discs 10 with a portion extending from the nest 18. When the chamber in the nest 18 is completely filled with capacitor discs 10 it is ready for the next step in the process of preparation. The capacitor discs 10 are loaded in the nest 18 to permit free rotation with a minimum of lateral displacement.

FIG. 3 shows the nest 18 containing ceramic discs 10 mounted in a frame 24 in an inverted position so that the discs 10 are brought into contact with the abrasive surface 20. The abrasive surface 20 is on a belt sander 21 and is movable laterally past the nest 18 and the frame 24 by suitable apparatus not shown. The belt sander 21 moves in a direction normal to the sides of the frame 24 and a nest 18 shown in FIG. 3 so that it may be considered as either moving into or out of FIG. 3 along that line of direction. The nest 18 is held in fixed position in relation to the belt sander 21 so that the discs rest lightly against the sander and are held in position by lateral walls 22 and 23 of the nest 18. The nest 18 is mounted in the frame 24 which holds the nest in position with respect to the belt sander. The nest is deep enough and the spacing between the frame and the belt small enough so that the discs are retained within the nest 18 when the nest 18 is on the frame 24 and discs in contact with the belt sander 21.

The belt sander is drawn past the nest 18 in its fixed position and in passing the abrasive surface abrades the periphery of the respective discs 10 and causes the silver on the respective peripheries of the respective discs to be worn or scraped off. The nest is supported above the belt sander 21 so that the discs 10 are free to rotate on the moving belt.

In FIG. 4 the nest 18 of FIGS. 2 and 3 is shown modified by the addition of a cover 25. The cover 25, which is attachable to the nest 18 by a headed post 26, has a lip 27 which engages the post 26. A lid 28 extends over the chamber formed in the nest 18. The lid 28 serves to retain the discs 10 inserted in the chamber of the nest 18. When the nest 18 is mounted in the frame adjacent the belt sander 21 the cover 25 serves to retain the discs 10 in the nest 18. The cover 25 is then removed allowing the discs 10 to drop on the belt 21 into the position shown in FIG. 3. The discs 10 fit within the nest 18 and extend from the open side so as to be engageable with the belt sander 21 when the cover 25 is removed.

A further development is shown in FIG. 5. The nest 18 of FIGS. 2, 3 and 4 is further modified. A cover 25 is provided on both the top and bottom. Each cover 25 is suitably secured, as by a spring loaded ball detent 29, on the nest 18 on the respective top and bottom. The nest 18 is loaded from the top with the top cover 25 removed and the bottom cover 25 on the nest mounted on a frame. After loading the top cover 25 is then put in place and the bottom cover 25 removed. The discs 10 drop on to the belt sander 21 and the operation is carried on as described above. In this modification the nest 18 can be mounted with either side up and thus inversion is obviated. The cover 25 is arranged so that it is easily removable and the discs fall on the belt in unison. As shown in FIG. 3 the spacing of the frame 24 from the belt sander 21 positions the nest 18 so that the discs 10 are free to independently engage the abrasive surface 20 while retained within the nest 18 against slipping out under the side of the nest 18 when subjected to the pull of the moving abrasive surface 20. As a result the discs 10 are retained in the nest 18 and the tendency of the belt sander 21 to pull the discs from the nest is counteracted.

Among other objects of this invention is the increased capacity by the complete utilization of the two faces of the discs. Further the two lateral surfaces of the discs are fully covered with an electrode. Thus, there is perfect registry of the opposing electrodes with one another.

Another feature of this invention is the grinding of the disc ceramic and electrode alike to a smaller size. This is advantageous in permitting the accommodation of a standard disc to various capacitor sizes, even after silvering. No contamination of the electrode on the discs occurs during this grinding operation. This eliminates one of the shortcomings of using a tumbling agent and tumbling the discs to remove the silver which had flowed over the disc edge.

Another advantage of this invention is the gentle handling of the small fragile ceramic bodies. A tumbling procedure is less desirable for articles of this nature.

It will be readily understood that the above-described embodiment of this invention is set forth herein for the purpose of illustration only. It is intended that the scope of this invention be limited only by the appended claims.

What is claimed is:

1. Method of making ceramic disc capacitors which comprises completely covering the flat surfaces of a plurality of ceramic discs with a conductive material, solidifying said conductive material, arranging said covered discs upright and rotatably free in a nest having lateral end walls connected by longitudinal side walls, supporting the freely rotatable discs in said upright arrangement by means of said lateral and longitudinal walls so as to have a minimum of lateral and longitudinal displacement, positioning said nest adjacent a flat movable abrasive surface with edges of said discs in contact with said surface, and moving said surface relative to said nest to simultaneously rotate and abrade said disc edges.

2. In the method of claim 1 the step of decreasing the disc radius to determine capacitor size and characteristics.

3. Method of making ceramic disc capacitors which comprises completely covering the flat surfaces of a plurality of ceramic discs with a conductive material, solidifying said conductive material, arranging said covered discs upright and rotatably free in a nest having lateral end walls connected by longitudinal side walls, supporting the freely rotatable discs in said upright arrangement by means of said lateral and longitudinal walls so as to have a minimum of lateral and longitudinal displacement, inverting said nest adjacent a flat movable abrasive surface with edges of said discs in contact with said surface, and moving said surface relative to said nest to simultaneously rotate and abrade said disc edges.

4. In the method of claim 3 the step of decreasing the disc radius to determine capacitor size and characteristics.

References Cited in the file of this patent
UNITED STATES PATENTS

| | | |
|---|---|---|
| 1,633,552 | Wells | June 21, 1927 |
| 2,204,010 | Conant | June 11, 1940 |
| 2,387,141 | Fruth | Oct. 16, 1945 |
| 2,606,955 | Herrick | Aug. 12, 1952 |
| 2,650,458 | Wallace | Sept. 1, 1953 |
| 2,768,421 | Gravley | Oct. 30, 1956 |